US010129550B2

(12) United States Patent
Seregin et al.

(10) Patent No.: US 10,129,550 B2
(45) Date of Patent: Nov. 13, 2018

(54) INTER-LAYER SYNTAX PREDICTION CONTROL (71) Applicant: QUALCOMM Incorporated, San Diego, CA (US)

(72) Inventors: Vadim Seregin, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 14/166,735

(22) Filed: Jan. 28, 2014

(65) Prior Publication Data

US 2014/0219363 A1 Aug. 7, 2014

Related U.S. Application Data (60) Provisional application No. 61/809,170, filed on Apr. 5, 2013, provisional application No. 61/772,370, filed
(Continued)

(51) Int. Cl.
H04N 19/30 (2014.01)
H04N 19/31 (2014.01)
(Continued)

(52) U.S. Cl.
CPC ........... *H04N 19/30* (2014.11); *H04N 19/105* (2014.11); *H04N 19/187* (2014.11); *H04N 19/31* (2014.11);
(Continued)

(58) Field of Classification Search
None
See application file for complete search history.

(56) References Cited

U.S. PATENT DOCUMENTS

2012/0081241 A1    4/2012  Misra et al.
2012/0140832 A1*   6/2012  Sjoberg .............. H04N 19/70
                                                        375/240.26
(Continued)

FOREIGN PATENT DOCUMENTS

CN         101422046 A    4/2009
JP         2015529410 A   10/2015
(Continued)

OTHER PUBLICATIONS

J. Boyce, K. Kei, & H. Lakshman, "TE6: Inter-layer syntax prediction from AVC base layer", JCT-VC Document K1106 (Oct. 2012).*
(Continued)

*Primary Examiner* — David N Werner
(74) *Attorney, Agent, or Firm* — Shumaker & Sieffert, P.A.

(57) ABSTRACT

An apparatus for coding video information according to certain aspects includes a memory unit and a processor in communication with the memory unit. The memory unit is configured to store video information associated with a base layer, an enhancement layer, or both. The processor is operationally coupled to the memory unit and is configured to provide a first indicator configured to enable or disable inter-layer syntax prediction and to provide a second indicator configured to enable or disable inter-layer texture prediction. The first and second indicators can be provided separately from each other. In one embodiment, the processor is further configured to disable inter-layer syntax prediction based at least in part upon information indicative of a codec associated with the base layer.

11 Claims, 5 Drawing Sheets

Related U.S. Application Data on Mar. 4, 2013, provisional application No. 61/759,969, filed on Feb. 1, 2013.

(51) Int. Cl.
| | |
|---|---|
| *H04N 19/33* | (2014.01) |
| *H04N 19/187* | (2014.01) |
| *H04N 19/46* | (2014.01) |
| *H04N 19/105* | (2014.01) |
| *H04N 19/70* | (2014.01) |
| *H04N 19/50* | (2014.01) |
| *H04N 19/52* | (2014.01) |
| *H04N 19/597* | (2014.01) |

(52) U.S. Cl.
CPC ............. *H04N 19/33* (2014.11); *H04N 19/46* (2014.11); *H04N 19/50* (2014.11); *H04N 19/52* (2014.11); *H04N 19/70* (2014.11); *H04N 19/597* (2014.11)

(56) References Cited

U.S. PATENT DOCUMENTS

| | | | |
|---|---|---|---|
| 2013/0208792 A1 | 8/2013 | He et al. | |
| 2013/0287093 A1 | 10/2013 | Hannuksela et al. | |
| 2013/0287109 A1 | 10/2013 | Wang et al. | |
| 2013/0322531 A1 | 12/2013 | Chen et al. | |
| 2015/0063453 A1* | 3/2015 | Kang | H04N 19/188 375/240.12 |
| 2015/0139325 A1* | 5/2015 | Chuang | H04N 19/51 375/240.16 |
| 2015/0201203 A1 | 7/2015 | Hendry et al. | |

FOREIGN PATENT DOCUMENTS

| | | |
|---|---|---|
| WO | WO-03026312 A2 | 3/2003 |
| WO | WO-2012167713 A1 | 12/2012 |
| WO | WO-2013128010 A2 | 9/2013 |
| WO | WO-2014038905 A2 | 3/2014 |

OTHER PUBLICATIONS

Table of documents for the Geneva Meeting (Jan. 2013) of the Joint Collaborative Team on Video Coding.*

Chuang T-D., et al., "AHG9: Inter-layer prediction flag and inter-layer syntax prediction flag", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL:http:/iwftp3.1tu.int/av-arch/jctvc-site/, No. JCTVC-L0071, Jan. 7, 2013 (Jan. 7, 2013), XP030113559, pp. 1-5.

Hannuksela M.M., "3DV-ATM Slice Header Prediction", 99. MPEG Meeting; Jun. 2, 2012-Oct. 2, 2012; San Josa CR ; (Motion Picture Expert Group or ISO/IEC JTC1/SC29/WG11), No. M23697, Jun. 7, 2012 (Jun. 7, 2012), pp. 1-11, XP030052222.

Hannuksela M.M., et al., "Test Model for Scalable Extensions of High Efficiency Video Coding (HEVC)," 103, MPEG Meeting; Jan. 21, 2013-Jan. 25, 2013; Geneva; (Motion Picture Expert Group or ISO/IEC JTC1/SC29/WG11), No. m28348, Jan. 22, 2013 (Jan. 22, 2013), XP030056894, pp. 1-50.

International Search Report and Written Opinion—PCT/US2014/013518—ISA/EPO—Apr. 17, 2014.

Sato (Sony) K: "SHVC: On Inter-layer Prediction", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: http:/iwftp3.1tu.int/av-arch/jctvc-site/, No. JCTVC-L0278, Jan. 8, 2013 (Jan. 8, 2013), XP030113766, pp. 1-4.

Schwarz et al., "Overview of the Scalable Video Coding Extension of the H.264/AVC Standard", IEEE Transactions on Circuits and Systems for Video Technology, Sep. 1, 2007, pp. 1103-1120, vol. 17, No. 9, pp. 1103-1120; IEEE Service Center, XP011193019, ISSN: 1051-8215, DOI: 10.1109/TCSVT.2007.905532.

Bross B., et al., "High Efficiency Video Coding (HEVC) text Specification draft 9" 11th. JCT-VC Meeting; Shanghai, CN Oct. 10-19, 2012; Document No. JCTVC-K1003_v13, Oct. 17, 2012 (Oct. 17, 2012), 317 pages.

Bross B., et al., "High Efficiency Video Coding (HEVC) text specification draft 10 (for FDIS & Consent)", 12th JCT-VC Meeting; 103, MPEG Meeting; Jan. 14, 2013-Jan. 23, 2013; Geneva; (Joint Collaborative Team on Video Coding of ISO/IEC JTC1/SC29/WG11 and ITU-T SG.16); URL: http://wftp3.itu.int/av-arch/jctvc-site/, Document No. JCTVC-L1003_v12, Jan. 17, 2013 (Jan. 17, 2013), 334 Pages.

Bross B., et al., "High Efficiency Video Coding (HEVC) text specification draft 8", 10$^{th}$ Meeting: Stockholm, SE; Jul. 11-20, 2012; (Joint Collaborative Team on Video Coding (JCT-VC) of ITU-T SG.16 WP3 and ISO/IEC JTC1/SC39/WG11); Doc. No. JCTVC-J1003_d7; 264 Pages.

Bross B., et al., "High efficiency video coding (HEVC) text specification draft 7 (JCTVC-I1003 d4) in v5.zip," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, vol. JCTVC-I1003_d4, Jun. 12, 2012 (Jun. 12, 2012); pp. 1-297.

Sato K., "SHVC: On Inter-Layer Prediction", Joint Collaborative Team on Video Coding (JCT-VC) of ITU-T SG 16 WP 3 and ISO/IEC JTC 1/SC 29/WG 11, 12th Meeting: Geneva, CH, Jan. 2013, JCTVC-L0278r2, pp. 1-5.

\* cited by examiner

INTER-LAYER SYNTAX PREDICTION CONTROL

CROSS REFERENCE TO RELATED APPLICATIONS

This application claims priority to U.S. Provisional No. 61/809,170, filed Apr. 5, 2013, U.S. Provisional No. 61/772,370, filed Mar. 4, 2013, and U.S. Provisional No. 61/759,969, filed Feb. 1, 2013, all of which are incorporated by reference in their entireties.

BACKGROUND

Field

This disclosure is related to the field of video coding and compression. In particular, it is related to High Efficiency Video Coding (HEVC) and its extensions, e.g., scalable video coding (SVC), multi-view video and 3D coding (MVC, 3DV), etc.

Description of the Related Art

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

In some situations it is desirable, to enable a type of prediction from a base layer referred to as inter-layer syntax prediction (including motion information) for specific base layer codecs (for example HEVC, etc.). However, the current SHVC (scalable extension of HEVC) design doesn't provide a mechanism to indicate whether such prediction from a base layer is allowed or not.

SUMMARY OF THE DISCLOSURE

In general, this disclosure describes techniques related to scalable video coding (SVC). The techniques described below provide a mechanism to indicate whether inter-layer syntax prediction (including motion information) is allowed for specific base layer codecs (e.g., HEVC, etc.).

In one embodiment, an apparatus is provided for encoding or decoding video information. The apparatus includes a memory unit configured to store video information associated with a base layer and/or an enhancement layer. The apparatus also includes a processor operationally coupled to the memory unit. The processor is configured to provide a first indicator configured to enable or disable inter-layer syntax prediction. The processor is also configured to provide a second indicator configured to enable or disable inter-layer texture prediction. The first and second indicators can be provided separately from each other. In another embodiment, the processor is configured to provide the first indicator to disable inter-layer syntax prediction based at least in part upon information indicative of a codec associated with the base layer.

In another embodiment, a method of decoding video information includes receiving a first indicator configured to enable or disable inter-layer syntax prediction and receiving a second indicator configured to enable or disable inter-layer texture prediction. The first and second indicators are received separately from each other. In one embodiment, the method also includes disabling inter-layer syntax prediction based at least in part upon information indicative of a codec associated with a base layer.

In another embodiment, a method of encoding video information includes providing a first indicator configured to enable or disable inter-layer syntax prediction and providing a second indicator configured to enable or disable inter-layer texture prediction. The first and second indicators are provided separately from each other. In one embodiment, the method also includes providing the first indicator to disable inter-layer syntax prediction based at least in part upon information indicative of a codec associated with a base layer.

In another embodiment, a non-transitory computer readable media includes code that when executed, causes a processor to provide a first indicator configured to enable or disable inter-layer syntax prediction and to provide a second indicator configured to enable or disable inter-layer texture prediction. The first and second indicators are provided separately from each other. In one embodiment, the code, when executed, further causes the processor to provide the first indicator to disable inter-layer syntax prediction based at least in part upon information indicative of a codec associated with a base layer.

In yet another embodiment, a means for coding video information includes means for providing a first indicator configured to enable or disable inter-layer syntax prediction and means for providing a second indicator configured to enable or disable inter-layer texture prediction. The first and second indicators can be provided separately from each other. In one embodiment, the means for providing the first indicator includes means for providing the first indicator to disable inter-layer syntax prediction based at least in part upon information indicative of a codec associated with a base layer.

The details of one or more examples are set forth in the accompanying drawings and the description below, which are not intended to limit the full scope of the inventive concepts described herein. Other features, objects, and advantages will be apparent from the description and drawings, and from the claims.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

The techniques described in this disclosure generally relate to scalable video coding (SVC) and multiview/3D video coding. For example, the techniques may be related to, and used with or within, a High Efficiency Video Coding (HEVC) scalable video coding (SVC, sometimes referred to as SHVC) extension. In an SVC extension, there could be multiple layers of video information. The layer at the very bottom level may serve as a base layer (BL), and the layer at the very top (or the highest layer) may serve as an enhanced layer (EL). The "enhanced layer" is sometimes referred to as an "enhancement layer," and these terms may be used interchangeably. The base layer is sometimes referred to as a "reference layer," (RL) and these terms may also be used interchangeably. All layers in between the base layer and the top layer may serve as either or both ELs or reference layers (RLs). For example, a layer in the middle may be an EL for the layers below it, such as the base layer or any intervening enhancement layers, and at the same time serve as a RL for the enhancement layers above it. Each layer in between the base layer and the top layer (or the highest layer) is may be used as a reference for inter-layer prediction by a higher layer and may use a lower layer as a reference for inter-layer prediction.

For simplicity, examples are presented in terms of just two layers: a BL and an EL; however, it should be well understood that the ideas and embodiments described below are applicable to cases with multiple layers, as well. In addition, for ease of explanation, the terms "frames" or "blocks" are often used. However, these terms are not meant to be limiting. For example, the techniques described below can be used with any of a variety of video units, including but not limited to pixels, blocks (e.g., CU, PU, TU, macroblocks, etc.), slices, frames, etc.

Video Coding

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, there is a new video coding standard, High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). The latest Working Draft (WD) of HEVC, and referred to as HEVC WD10 hereinafter, is available on the JCT-VC document management system at document number JCTVC-L1003-v12. Another working draft of HEVC, and referred to as HEVC WD9, is available on the JCT-VC document management system at document number JCTVC-K1003-v13. Another working draft of HEVC, referred to as HEVC WD8 (or WD8) is available on the JCT-VC document management system at document number JCTVC-J1003-v8. Another working draft of HEVC, and referred to as HEVC WD7 hereinafter, is available on the JCT-VC document management system at document number JCTVC-I1003-v5. All of these documents are incorporated by reference in their entireties.

Scalable video coding (SVC) may be used to provide quality (also referred to as signal-to-noise (SNR)) scalability, spatial scalability and/or temporal scalability. For example, in one embodiment, a reference layer (e.g., a base layer) includes video information sufficient to display a video at a first quality level and the enhancement layer includes additional video information relative to the reference layer such that the reference layer and the enhancement layer together include video information sufficient to display the video at a second quality level higher than the first level (e.g., less noise, greater resolution, better frame rate, etc.). An enhanced layer may have different spatial resolution than a base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In the SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion of the base layer to predict motion in the enhancement layer. Inter-layer residual prediction uses the residue of the base layer to predict the residue of the enhancement layer.

In some embodiments of inter-layer motion prediction, the motion data of the base layer (e.g., for the co-located block) may be used to predict the current block in the enhancement layer. For example, while coding a video unit in an enhancement layer, video coders can use information from a reference layer to obtain additional motion compensation data that can be used to identify additional hypotheses. As these additional hypotheses are implicitly derived from data already existing data in a video bitstream, additional performance in video coding can be gained with little or no additional cost in bitstream size. In another example, motion information from spatially neighboring video units can be used to locate additional hypothesis. The derived hypothesis can then be averaged or otherwise combined with explicitly encoded hypothesis to generate a better prediction of a value of a video unit.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Video Coding System

Figure 1:
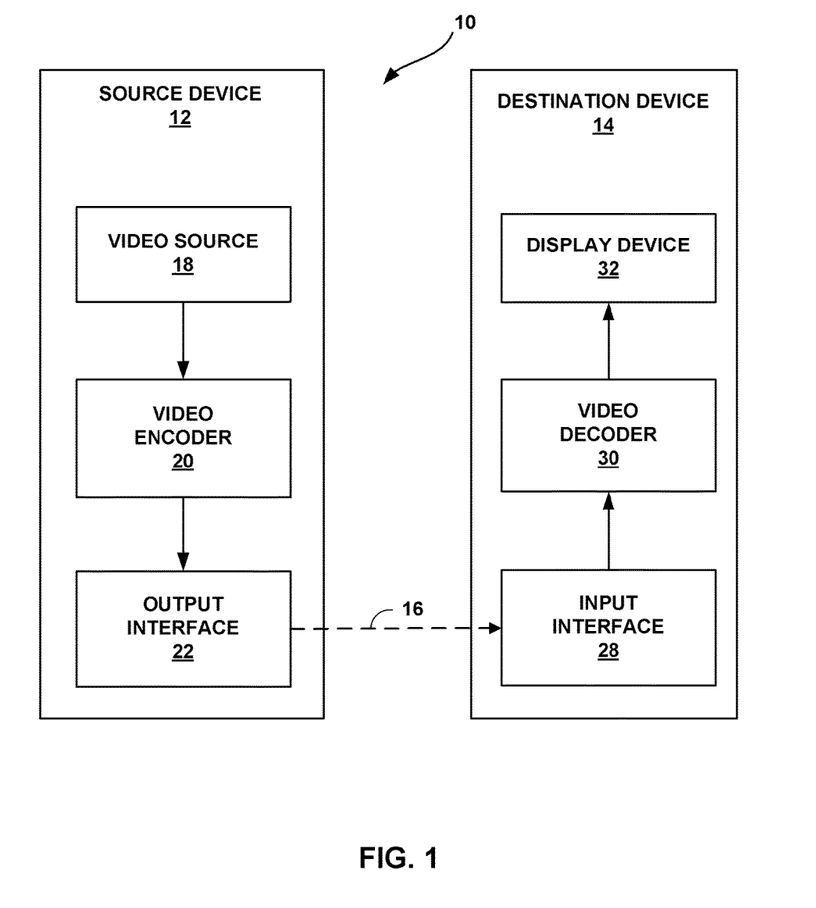
FIG. 1 is a block diagram illustrating an example video encoding and decoding system that may utilize techniques in accordance with aspects described in this disclosure.

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 can provide the video data to the destination device 14 via a computer-readable medium 16. Source device 12 and destination device 14 may include a wide range of devices, including desktop computers, notebook (e.g., laptop) computers, tablet computers, set-top boxes, telephone handsets, such as so-called "smart" phones, so-called "smart" pads, televisions, cameras, display devices, digital media players, video gaming consoles, in-car computers, video streaming devices, or the like. Source device 12 and destination device 14 may be equipped for wireless communication.

Destination device 14 may receive the encoded video data to be decoded via computer-readable medium 16. Computer-readable medium 16 may comprise a type of medium or device capable of moving the encoded video data from source device 12 to destination device 14. For example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network, such as the Internet. The communication medium may include routers, switches, base stations, or other equipment that may be useful to facilitate communication from source device 12 to destination device 14.

In some embodiments, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or other digital storage media for storing video data. The storage device may correspond to a file server or another intermediate storage device that may store the encoded video generated by source device 12. Destination device 14 may access stored video data from the storage device via streaming or download. The file server may be a type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through a standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure can apply applications or settings in addition to wireless applications or settings. The techniques may be applied to video coding in support of a of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some embodiments, system 10 may be configured to support one-way or two-way video transmission to support applications such as video streaming, video playback, video broadcasting, and/or video telephony.

In FIG. 1, source device 12 includes video source 18, video encoder 20, and output interface 22. Destination device 14 includes input interface 28, video decoder 30, and display device 32. Video encoder 20 of source device 12 may be configured to apply the techniques for coding a bitstream including video data conforming to multiple standards or standard extensions. In other embodiments, a source device and a destination device may include other components or arrangements. For example, source device 12 may receive video data from an external video source 18, such as an external camera. Likewise, destination device 14 may interface with an external display device, rather than including an integrated display device.

Video source 18 of source device 12 may include a video capture device, such as a video camera, a video archive containing previously captured video, and/or a video feed interface to receive video from a video content provider. Video source 18 may generate computer graphics-based data as the source video, or a combination of live video, archived video, and computer-generated video. In some embodiments, if video source 18 is a video camera, source device 12 and destination device 14 may form so-called camera phones or video phones. The captured, pre-captured, or computer-generated video may be encoded by video encoder 20. The encoded video information may be output by output interface 22 to a computer-readable medium 16.

Computer-readable medium 16 may include transient media, such as a wireless broadcast or wired network transmission, or storage media (e.g., non-transitory storage media), such as a hard disk, flash drive, compact disc, digital video disc, Blu-ray disc, or other computer-readable media. A network server (not shown) may receive encoded video data from source device 12 and provide the encoded video data to destination device 14 (e.g., via network transmission). A computing device of a medium production facility, such as a disc stamping facility, may receive encoded video data from source device 12 and produce a disc containing the encoded video data. Therefore, computer-readable medium 16 may be understood to include one or more computer-readable media of various forms.

Input interface 28 of destination device 14 can receive information from computer-readable medium 16. The information of computer-readable medium 16 may include syntax information defined by video encoder 20, which can be used by video decoder 30, that includes syntax elements that describe characteristics and/or processing of blocks and other coded units, e.g., GOPs. Display device 32 displays the decoded video data to a user, and may include any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete sine transform (DST), a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video Encoder

Figure 2:
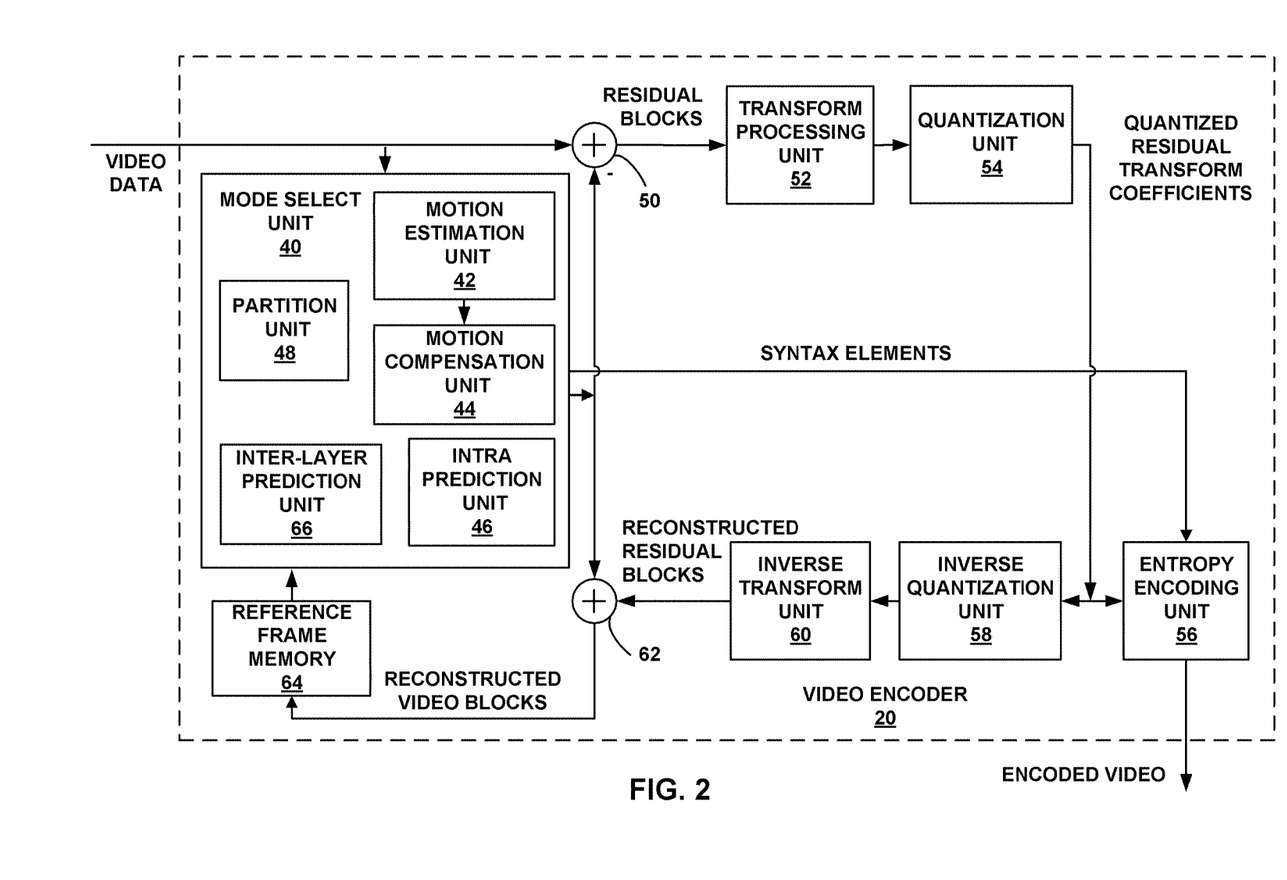
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure, including but not limited to the methods of controlling inter-layer syntax prediction and controlling motion prediction described in greater detail below with respect to FIGS. 4 and 5. As one example, mode selection unit 40 or inter-layer prediction unit 66 (when provided) may be configured to perform any or all of the techniques described in this disclosure. In other embodiments, inter-layer prediction can be performed by mode selection unit 40, in which case the inter-layer prediction unit 66 may be omitted. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

Video encoder 20 may perform intra-, inter-, and inter-layer prediction (sometime referred to as intra-, inter- or inter-layer coding) of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Inter-layer coding relies on prediction based upon video within a different layer(s) within the same video coding sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, inter-layer prediction unit 66, and partition unit 48.

For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization, etc.). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra, inter, or inter-layer prediction mode, e.g., based on error results, and provide the resulting intra-, inter-, or inter-layer coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In some embodiments, motion estimation unit 42 can perform motion estimation relative to luma components, and motion compensation unit 44 can use motion vectors calculated based on the luma components for both chroma components and luma components. Mode select unit 40 may generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

The video encoder 20 may include an inter-layer prediction unit 66. Inter-layer prediction unit 66 is configured to predict a current block (e.g., a current block in the EL) using one or more different layers that are available in SVC (e.g., a base or reference layer). Such prediction may be referred to as inter-layer prediction. Inter-layer prediction unit 66 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. For example, discrete sine transforms (DST), wavelet transforms, integer transforms, sub-band transforms or other types of transforms can also be used.

Transform processing unit 52 can apply the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain (e.g., for later use as a reference block). Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Video Decoder

Figure 3:
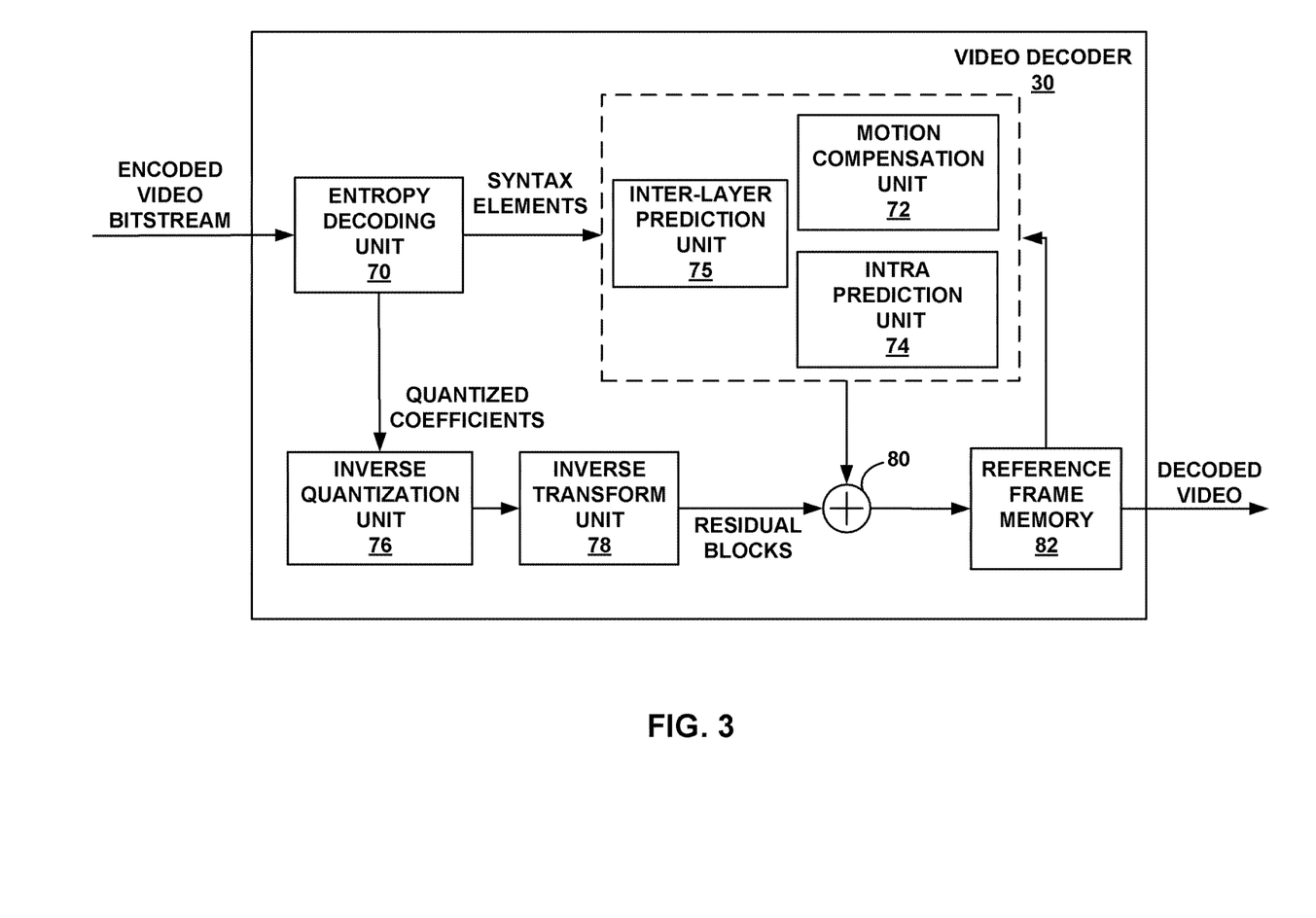
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure, including but not limited to the methods of controlling inter-layer syntax prediction and controlling motion prediction described in greater detail below with respect to FIGS. 4 and 5. As one example, inter-layer prediction unit 75 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes an entropy decoding unit 70, motion compensation unit 72, intra prediction unit 74, inter-layer prediction unit 75, inverse quantization unit 76, inverse transformation unit 78, reference frame memory 82 and summer 80. In some embodiments, motion compensation unit 72 and/or intra prediction unit 74 may be configured to perform inter-layer prediction, in which case the inter-layer prediction unit 75 may be omitted. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Video decoder 30 may also include an inter-layer prediction unit 75. The inter-layer prediction unit 75 is configured to predict a current block (e.g., a current block in the EL) using one or more different layers that are available in SVC (e.g., a base or reference layer). Such prediction may be referred to as inter-layer prediction. Inter-layer prediction unit 75 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Inverse quantization unit 76 inverse quantizes, e.g., de-quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse DST, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

Inter-Layer Syntax Prediction

In the current SHVC test model, the motion field (e.g., motion vector and reference index) and prediction mode from the base layer can be used for the enhancement layer coding. However, the base layer codec that can be used with the current inter-layer syntax prediction is not specified.

Base Layer Codec

In the current SHVC test model, a base layer codec can be HEVC or H.264/AVC. In addition, there is a flag in the video parameter set (VPS) that indicates whether HEVC or AVC applies. The flag avc_base_layer_flag equaling 1 specifies that the base layer conforms to Rec. ITU-T H.264|ISO/IEC 14496-10; the flag equal to 0 specifies that it conforms to the HEVC specification. Therefore, a device used to encode or decode an enhancement layer can know whether AVC or HEVC is used with respect to the base layer.

Inter-View Motion Prediction Signaling

In some techniques, a flag inter_view_texture_flag is signaled for each dependent view. The flag indicates whether only inter-view motion prediction is used for a dependent view such that the inter-view prediction based on reconstructed pixels (e.g., inter-view texture prediction) is not used. Furthermore an indication (e.g., two flags) may be used to indicate whether inter-view texture prediction is enabled and whether inter-view motion prediction is enabled.

Such a signaling can be provided, for example, in a sequence parameter set ("SPS"). However, syntax elements that are put in sequence parameter sets may also (or alternatively) be provided in video parameter sets ("VPS") to achieve similar functionalities. In addition, the same concept can be transparently used for scalable codecs.

As mentioned above, it can be desirable, for example, to enable inter-layer syntax prediction (including motion information) for specific base layer codec, for example HEVC, etc. However, the current SHVC (scalable extension of HEVC) design doesn't have a way to indicate whether such a prediction from a base layer is allowed or not.

Inter-Layer Syntax Prediction Control

In one embodiment, an encoder or decoder is provided with a processor that determines whether a multi-standard codec is used to encode or decode a video block. For example, using a multi-standard codec can refer to coding enhancement and base layers with different codec, such as, for example, coding the enhancement layer according to HEVC and coding the base layer according to a non-HEVC codec, such as AVC. As one example, to determine whether the base layer has been coded according to AVC, the processor can determine whether a flag, e.g., avc_base_layer_flag, is set or not (e.g., equal to 1 or 0), within a video parameter set. If a non-HEVC codec (e.g., AVC or other non-HEVC codec) is used, inter-layer syntax prediction is disabled by the processor. However, if the motion information of the non-HEVC codec coded layer is available to the base layer, then the inter-layer syntax prediction can be used.

Alternatively, a flag can be provided to specifically signal the usage of inter-layer syntax prediction. In one embodiment, syntax prediction refers to the process of using base layer syntax elements (e.g., motion vector, reference indices, prediction mode, etc.) to predict enhancement layer syntax elements. In general, in one embodiment syntax information may refer to non-texture or non-pixel information. Furthermore, a syntax element having more than a binary state (such that it can have a value other than just two values, such as 0 or 1) can be used for indication instead of a flag. The terms "indicator" and "flag" refer generally to flags as well as such syntax elements. If this indicator (or flag) is 0, inter-layer syntax prediction tools are not enabled for any video coding layer (VCL) network abstraction layer (NAL) unit of the coded video sequence. In this case, the inter-layer syntax prediction flag can always be signaled as disabled if the avc_base_layer_flag specifies only a particular base layer codec (for example HEVC), in a video parameter set of a sequence parameter set.

Alternatively or in addition to the techniques above, a flag or syntax element can be introduced to indicate whether inter-layer texture prediction is enabled for any VCL NAL unit of the coded video sequence. In other words, an indicator (sometimes referred to as an indication), such as one or more flags or syntax elements, is provided to distinguish different inter-layer prediction types, including at least inter-layer syntax prediction and inter-layer texture prediction.

Alternatively or in addition to the techniques above, the above mentioned flags can be signaled separately for VCL NAL units that do or do not belong to random access pictures. This way, two sets of signaled flags can be present in the video parameter set or the sequence parameter set; one for the NAL units that do not belong to random access pictures and one for the NAL units that do belong to random access pictures.

In yet another embodiment, for a particular avc_base_layer_flag, inter-layer syntax prediction flag signaling in the enhancement layer can be skipped. In such cases, the inter-layer syntax prediction flag can be inferred to be disabled (e.g., equal to zero).

In another embodiment, a high level syntax flag or syntax element that controls inter-layer syntax prediction can be signaled in at least a video parameter set (VPS), sequence parameter set (SPS), or picture parameter set (PPS).

A flag may also be signaled in a slice header to indicate whether the current slice is to be used for inter-layer texture prediction or not. In addition, a flag may be signaled in the slice header to indicate whether the current slice is to be used for inter-layer syntax prediction.

A flag may also be signaled in slice header to indicate whether the current slice utilizes (e.g., is predicted from) inter-layer texture prediction with any of its dependent layers. In addition, a flag may be signaled in the slice header to indicate whether the current slice utilizes inter-layer syntax prediction with any of its dependent layers. In addition, or alternatively, a flag may be signaled in the slice header to indicate whether the current slice utilizes any kind of inter-layer prediction from any dependent layers.

In addition, the above mentioned flags can be present as part of the extra slice header bits, as indicated by slice_reserved_flag[i].

For example, in the current SHVC test model there is a motion mapping tool when motion field and prediction mode from the base layer are mapped to the inter-layer reference picture. This tool can be enabled only for the HEVC base layer codec (e.g., when avc_base_layer_flag is equal to zero). Alternatively the high level syntax flag can be introduced for motion mapping tool. If this flag is zero, motion mapping is not used. In one embodiment, the motion mapping flag is always equal to zero if avc_base_layer_flag is equal to zero, or the motion mapping flag signaling can be skipped if avc_base_layer_flag is equal to zero and the motion mapping flag is inferred to be zero.

The techniques described herein are applicable to other HEVC extensions, such as, but not limited to MVC and 3DV. In such cases, the techniques discussed above with respect to layers would be applied to views. If other base layer codec can be used, for example MPEG-2, a similar identification flag can be introduced. The disclosed techniques may be extended with such similar methods and codec uses.

Figure 4:
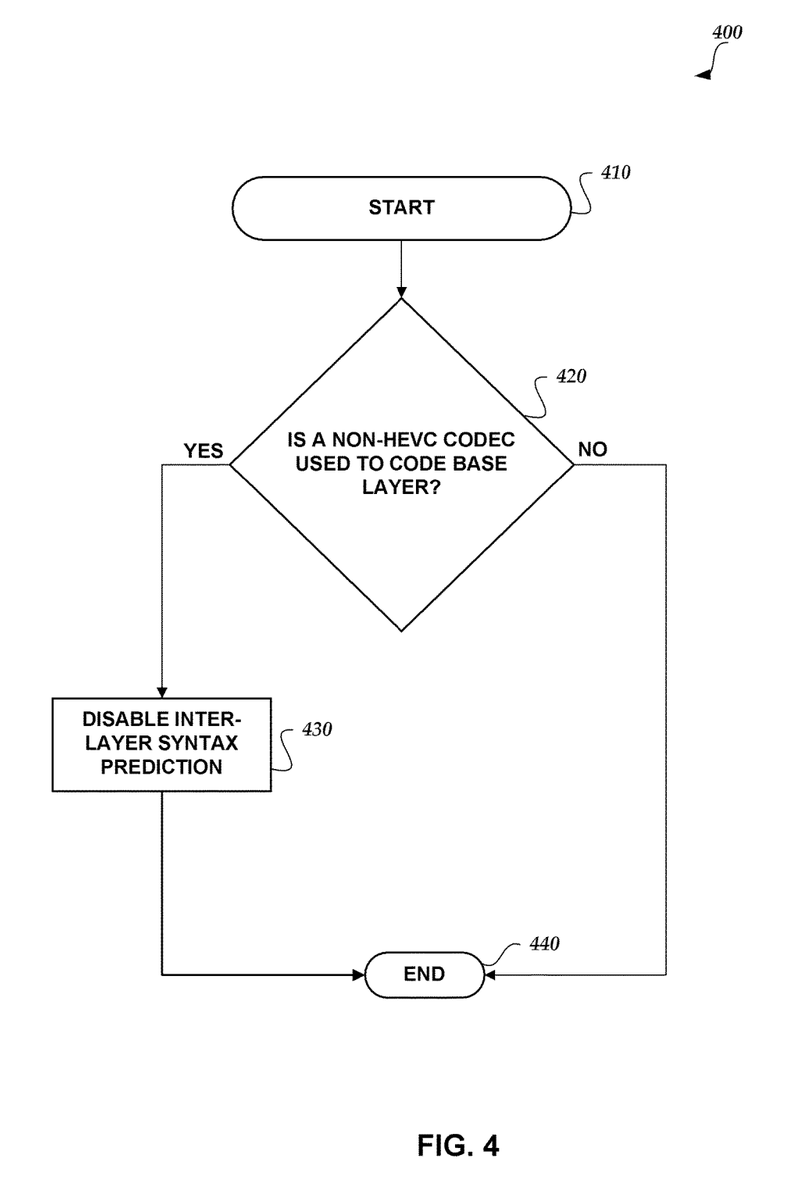
FIG. 4 is a flowchart illustrating an embodiment of a method for controlling inter-layer syntax prediction according to aspects of this disclosure

FIG. 4 illustrates one embodiment of a method of controlling inter-layer syntax prediction during SHVC coding that may be performed by the video encoder 20 of FIG. 2 or the video decoder 30 of FIG. 3. The method 400 begins at block 410. At block 420, it is determined whether a non-HEVC codec (e.g., AVC, etc.) is used to code (e.g., encode or decode) the base layer of an enhancement layer, while HEVC is used to code the enhancement layer. For example, an indicator, such as a flag or syntax element, may be provided to indicate the codec used to code the base layer, or more generally, to indicate whether a non-HEVC codec is used to code the base layer. One such flag, avc_base_layer_flag, discussed above, indicates that a non-HEVC codec (i.e., AVC) is used to code the base layer when it is equal to 1. Other flags or indicators may be used. If a non-HEVC codec is used to code the base layer, the method proceeds to block 430; otherwise, the method 400 ends at block 440. For example, if is determined that HEVC is used to code the base layer, or if it cannot be determined whether a non-HEVC codec is used to code the base layer, the method proceeds to block 440. At block 430 inter-layer syntax prediction is disabled. For example, an indicator can be provided to indicate that inter-layer syntax prediction is not available as a coding mode. In one embodiment, such indicator can be signaled independently of other inter-layer prediction modes (e.g., inter-layer texture prediction, etc.), as discussed in greater detail above. The method 400 then proceeds to block 440 where the method 400 ends.

Disabling TMVP

In HEVC extensions (e.g., SVC or MVC), one or multiple base layer/view motion vector candidates can be included into Merge/AMVP candidate lists along with a temporal motion vector candidate (TMVP). In HEVC, there is only one collocated reference picture used to code (encode or decode) all slices in the current picture. For this purpose, an index value collocated_ref_idx is signaled in slice header, but is restricted to be the same for all slices in a frame.

However, using base layer/view motion vectors may introduce bandwidth increase associated with accessing motion vectors from two different collocated pictures: one temporal reference picture for TMVP and one base layer/view picture for base layer/view motion vectors.

HEVC only uses one picture, which is different from the current picture, for motion vector prediction. In the scalable or multiview extension of HEVC, the collocated picture of a current picture can only be either a temporal reference picture defined by the index value collocated_ref_idx or an inter-view/layer reference picture base.

To restrict the usage of the base layer/view motion vector (MV) candidates and TMVP, embodiments of an encoder or decoder may include at least one of the following conditions ("Restriction Conditions"):

1. In some embodiments, video data may be encoded or decoded such that base layer/view MV candidates cannot be used for any slice of the current picture if at least in one slice of the picture has TMVP enabled, (for example the flag slice_temporal_mvp_enabled_flag is equal to 1).
2. In some embodiments, the video data may be encoded/decoded such that base layer/view MV candidates can be used in a Merge/AMVP list if the flag slice_temporal_mvp_enabled_flag is equal to 0 for all slices in the picture, or alternatively if the flag sps_temporal_mvp_enabled_flag is equal to 0.
3. In some embodiments, the video data may be encoded/decoded such that, in embodiments in which inter-layer/view motion prediction usage is indicated by a flag, e.g., slice_motion_prediction_flag, as described above, the flags slice_motion_prediction_flag and slice_temporal_mvp_enabled_flag cannot be both equal to 1 in any one slice. In addition, the flag slice_motion_prediction_flag should always be 0 for all slices once when at least one slice has the flag slice_temporal_mvp_enabled_flag equal to 1. Likewise, the flag slice_temporal_mvp_enabled_flag should be always 0 for all slices once when at least one slice has the flag slice_motion_prediction_flag equal to 1 in the same picture.
4. Alternatively, in some embodiments, the flags slice_motion_prediction_flag and slice_temporal_mvp_enabled_flag are conditionally signaled. For example, in one example coding the syntax may be:

| | Descriptor |
|---|---|
| slice_segment_header( ) { | |
| ... | |
|    slice_motion_prediction_flag | u(1) |
|    if( sps_temporal_mvp_enabled_flag && | |
|    !slice_motion_prediction_flag ) { | |
|       slice_temporal_mvp_enabled_flag | u(1) |
|    } | |
| ... | |
| } | |

Alternatively, in another coding example:

| | Descriptor |
|---|---|
| slice_segment_header( ) { | |
| ... | |
|    if( sps_temporal_mvp_enabled_flag) { | |
|       slice_temporal_mvp_enabled_flag | u(1) |
|    } | |
|    if(!slice_temporal_mvp_enabled_flag) { | |
|       slice_motion_prediction_flag | u(1) |
|    } | |
| ... | |
| } | |

If the flag slice_motion_prediction_flag is not present it shall be inferred by the processor of the encoder or decoder to be equal to 0 with flags constrained as discussed above (e.g., see item #3).

5. In some embodiments, coding may be similar to 3DV in that the inter-layer motion prediction can be controlled by VPS, SPS, or PPS flags as described above. For example, in one embodiment, for a VPS flag the syntax table can be or include the following:

| | Descriptor |
|---|---|
| vps_extension( ) { | |
| ... | |
|    vps_motion_prediction_flag | u(1) |
| ... | |
| } | |
| slice_segment_header( ) { | |
| ... | |
|    if( vps_motion_prediction_flag ) { | |
|       slice_motion_prediction_flag | u(1) |
|    } | |
|    if( sps_temporal_mvp_enabled_flag && | |
|    !slice_motion_prediction_flag ) { | |
|       slice_temporal_mvp_enabled_flag | u(1) |
|    } | |
| ... | |
| } | |

In another embodiment of a signaling scheme:

| | Descriptor |
|---|---|
| slice_segment_header( ) { | |
| ... | |
|    if( sps_temporal_mvp_enabled_flag) { | |
|       slice_temporal_mvp_enabled_flag | u(1) |
|    } | |
|    if(!slice_temporal_mvp_enabled_flag && | |
|    vps_motion_prediction_flag ) { | |
|       slice_motion_prediction_flag | u(1) |
|    } | |
| ... | |
| } | |

If the flag vps_motion_prediction_flag is not present it shall be inferred by the processor of the encoder or decoder to be equal to zero with the flags constrained such as described above (e.g., see items #3 and #4, above).

6. In some of the above embodiments, two flags are used to control motion prediction from the base layer and TMVP. In another embodiment, only one flag is used to control either TMVP or base layer MV candidate usage in merge/AMVP modes. For example, this may be included in an embodiment in which base layer/view MV candidates and TMVP candidate are restricted to be not used together at sequence level.

For such embodiments, the semantics of the element slice_temporal_mvp_enabled_flag can be changed in a way that this flag can control the usage of the either TMVP or base layer/view MV candidates in a slice. For example, in one embodiment, semantics of the element can be that slice_temporal_mvp_enabled_flag specifies whether temporal motion vector predictors or reference layer motion predictors can be used for inter prediction. If slice_temporal_mvp_enabled_flag is equal to 0, the syntax elements of the current picture shall be constrained such that no temporal motion vector predictor or reference layer motion predictors is used to decode the current picture. Otherwise (when slice_temporal_mvp_enabled_flag is equal to 1), temporal motion vector predictors or reference layer motion predictors may be used to decode the current picture. When not present, the value of slice_temporal_mvp_enabled_flag is inferred to be equal to 0.

For example, in one embodiment, a syntax implementation may include the following:

| | Descriptor |
|---|---|
| slice_segment_header( ) { | |
| ... | |
|    if( sps_temporal_mvp_enabled_flag || | |
|    vps_motion_prediction_flag ) | |
|       slice_temporal_mvp_enabled_flag | u(1) |
| ... | |
| } | |

Figure 5:
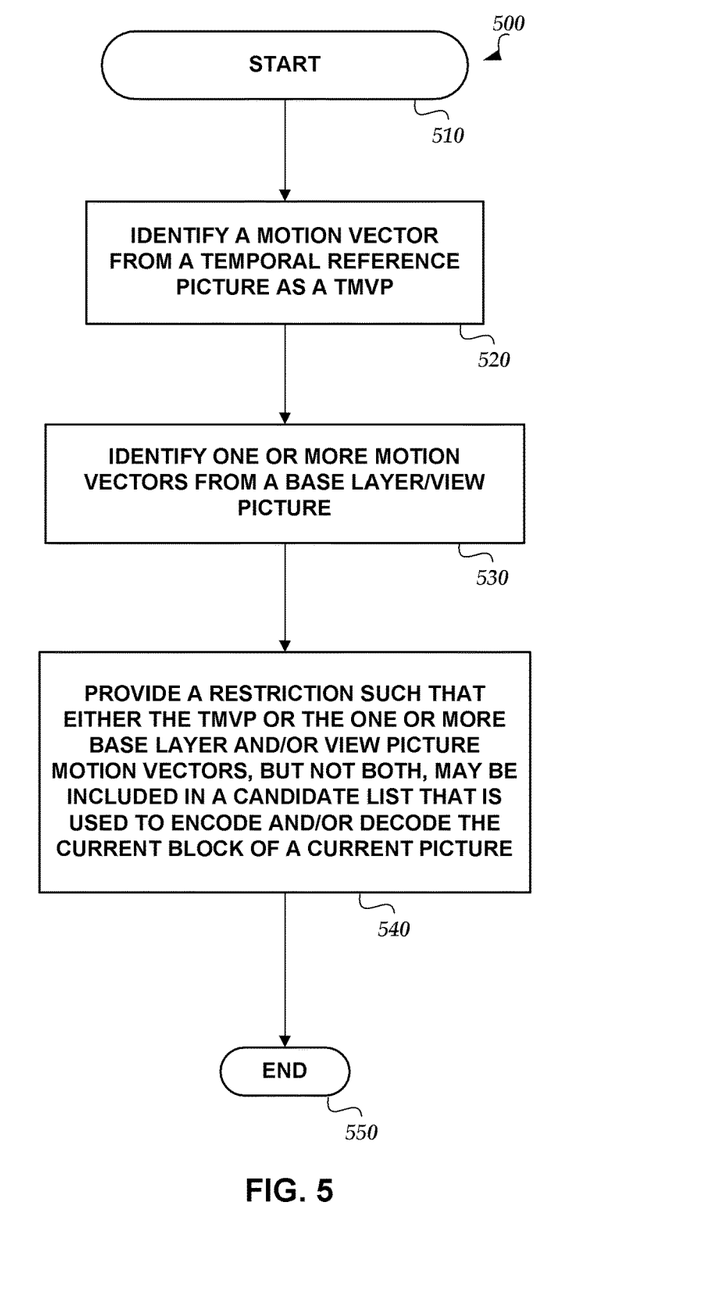
FIG. 5 is a flowchart illustrating another embodiment of a method for controlling motion prediction according to aspects of this disclosure.

FIG. 5 illustrates one embodiment of a method of controlling motion prediction that may be performed by the video encoder 20 of FIG. 2 or the video decoder 30 of FIG. 3. The method 500 begins at block 510. At block 520, a motion vector from a temporal reference picture is identified as a temporal motion vector predictor (TMVP). At block 530, one or more motion vectors from a base layer and/or view picture are identified as base layer/view motion vectors. At block 540 a restriction is provided such that either the TMVP or the one or more base layer/view motion vectors, but not both, may be included in a candidate list that is used to encode and/or decode a current block of a current picture. The restriction may be provided based upon any one or more of the Restriction Conditions discussed above. In general, the current picture is collocated with respect to the temporal reference picture and the base layer/view picture. The method 500 continues to block 550 and ends.

While the above disclosure has described particular embodiments, many variations are possible. For example, as mentioned above, the above techniques may be applied to 3D video encoding. In some embodiments of 3D video, a reference layer (e.g., a base layer) includes video information sufficient to display a first view of a video and the enhancement layer includes additional video information relative to the reference layer such that the reference layer and the enhancement layer together include video information sufficient to display a second view of the video. These two views can used to generate a stereoscopic image. As discussed above, motion information from the reference layer can be used to identify additional implicit hypothesis when encoding or decoding a video unit in the enhancement layer, in accordance with aspects of the disclosure. This can provide greater coding efficiency for a 3D video bitstream.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Various embodiments of the invention have been described. These and other embodiments are within the scope of the following claims.

What is claimed is:

1. An apparatus for decoding video information, the apparatus comprising:
    a memory configured to store video data associated with at least one of a base layer or an enhancement layer; and
    a processor operationally coupled to the memory and configured to:
        receive an indication indicating a codec associated with the base layer in at least one of a video parameter set or a video parameter set extension;
        in response to the indication that the codec associated with the base layer is High Efficiency Video Coding (HEVC) codec, receive a non-binary indication having a value selected from a group comprising at least three values in at least one of the video parameter set or the video parameter set extension;
        determine, based on the value of the non-binary indication whether inter-layer syntax prediction is to be enabled or disabled;
        determine, based on the value of the non-binary indication whether inter-layer texture prediction is to be enabled or disabled; and
        perform at least one of inter-layer syntax prediction or inter-layer texture prediction based on the value of the non-binary indication,
    wherein the determination of whether inter-layer syntax prediction is to be enabled or disabled and the determination of whether inter-layer texture prediction is to be enabled or disabled are independent of each other.

2. The apparatus of claim 1, wherein the non-binary indication and the indication indicating a codec associated with the base layer respectively comprise first and second flags or respectively comprise first and second syntax elements.

3. The apparatus of claim 1, wherein the non-binary indication and the indication indicating a codec associated with the base layer comprise different flags or comprise different syntax elements.

4. The apparatus of claim 1, wherein the apparatus comprises at least one of a desktop computer, a notebook computer, a laptop computer, a tablet computer, a set-top box, a telephone handset, a smart phone, a smart pad, a television, a camera, a display device, a digital media player, a video gaming console, an in-car computer, a video streaming device, or a device equipped for wireless communication.

5. A method of decoding video information, comprising:
receiving an indication indicating a codec associated with a base layer in at least one of a video parameter set or a video parameter set extension;
in response to the indication that the codec associated with the base layer is High Efficiency Video Coding (HEVC) codec, receiving a non-binary indication having a value selected from a group comprising at least three values in at least one of the video parameter set or the video parameter set extension;
determining, based on the value of the non-binary indication whether inter-layer syntax prediction is to be enabled or disabled;
determining, based on the value of the non-binary indication whether inter-layer texture prediction is to be enabled or disabled; and
performing at least one of inter-layer syntax prediction or inter-layer texture prediction based on the value of the non-binary indication, wherein the determination of whether inter-layer syntax prediction is to be enabled or disabled and the determination of whether inter-layer texture prediction is to be enabled or disabled are independent of each other.

6. The method of claim 5, wherein the non-binary indication and the indication indicating a codec associated with the base layer respectively comprise first and second flags or respectively comprise first and second syntax elements.

7. The method of claim 5, wherein the non-binary indication and the indication indicating a codec associated with the base layer comprise different flags or comprise different syntax elements.

8. A non-transitory, computer-readable storage medium storing instructions, that when executed by a processor, cause the processor to:
receive an indication indicating a codec associated with a base layer in at least one of a video parameter set or a video parameter set extension;
in response to the indication that the codec associated with the base layer is High Efficiency Video Coding (HEVC) codec, receive a non-binary indication having a value selected from a group comprising at least three values in at least one of the video parameter set or the video parameter set extension;
determine, based on the value of the non-binary indication whether inter-layer syntax prediction is to be enabled or disabled;
determine, based on the value of the non-binary indication whether inter-layer texture prediction is to be enabled or disabled; and
perform at least one of inter-layer syntax prediction or inter-layer texture prediction based on the value of the non-binary indication,
wherein the determination of whether inter-layer syntax prediction is to be enabled or disabled and the determination of whether inter-layer texture prediction is to be enabled or disabled are independent of each other.

9. The non-transitory, computer-readable storage medium of claim 8, wherein the non-binary indication and the indication indicating a codec associated with the base layer respectively comprise first and second flags or respectively comprise first and second syntax elements.

10. A means for decoding video information, comprising:
means for receiving an indication indicating a codec associated with a base layer in at least one of a video parameter set or a video parameter set extension;
in response to the indication that the codec associated with the base layer is High Efficiency Video Coding (HEVC) codec, means for receiving a non-binary indication having a value selected from a group comprising at least three values in at least one of the video parameter set or the video parameter set extension;
means for determining, based on the value of the non-binary indication whether inter-layer syntax prediction is to be enabled or disabled;
means for determining, based on the value of the non-binary indication whether inter-layer texture prediction is to be enabled or disabled; and
means for performing at least one of inter-layer syntax prediction or inter-layer texture prediction based on the value of the non-binary indication,
wherein the determination that inter-layer syntax prediction is to be enabled or disabled and the determination of whether inter-layer texture prediction is to be enabled or disabled are independent of each other.

11. The means for decoding video information of claim 10, wherein the non-binary indication and the indication indicating a codec associated with the base layer respectively comprise first and second flags or respectively comprise first and second syntax elements.

* * * * *